(12) United States Patent
Yanovsky et al.

(10) Patent No.: US 7,739,253 B1
(45) Date of Patent: Jun. 15, 2010

(54) LINK-BASED CONTENT RATINGS OF PAGES

(75) Inventors: Boris Yanovsky, Saratoga, CA (US); Roman Yanovsky, Los Altos, CA (US); John Everett Gmuender, San Jose, CA (US); Shunhui Zhu, San Jose, CA (US)

(73) Assignee: SonicWALL, Inc., San Jose, CA (US)

( * ) Notice: Subject to any disclaimer, the term of this patent is extended or adjusted under 35 U.S.C. 154(b) by 266 days.

(21) Appl. No.: 11/112,505

(22) Filed: Apr. 21, 2005

(51) Int. Cl.
*G06F 7/00* (2006.01)
*G06F 17/30* (2006.01)

(52) U.S. Cl. .................. 707/705; 707/706; 707/709

(58) Field of Classification Search .............. None
See application file for complete search history.

(56) References Cited

U.S. PATENT DOCUMENTS

| | | | | |
|---|---|---|---|---|
| 6,192,360 B1 * | 2/2001 | Dumais et al. | ............... | 707/6 |
| 6,687,696 B2 * | 2/2004 | Hofmann et al. | ............... | 707/6 |
| 6,772,214 B1 * | 8/2004 | McClain et al. | ............. | 709/229 |
| 7,082,429 B2 * | 7/2006 | Lin et al. | ....................... | 707/5 |
| 2003/0225763 A1 * | 12/2003 | Guilak et al. | .................. | 707/7 |
| 2005/0060404 A1 * | 3/2005 | Ahlander et al. | ............ | 709/224 |

* cited by examiner

*Primary Examiner*—Jean M Corrielus
*Assistant Examiner*—Aleksandr Kerzhner
(74) *Attorney, Agent, or Firm*—Blakely, Sokoloff, Taylor & Zafman LLP

(57) ABSTRACT

Methods and apparatuses for link-based content ratings for pages are described herein. According to one embodiment, statistics for each of multiple pages is determined with respect to one or more predetermined categories based on the content rating of each of the pages. For each of the categories, a set of primary pages having relationships (e.g., links) with one or more secondary pages is selected, where the selected pages probabilistically distinguish from relationships with other pages. Other methods and apparatuses are also described.

26 Claims, 12 Drawing Sheets

| Training Set Tokens | Category 1: Gambling | | Category 2: Sports | | Category 3: News | |
|---|---|---|---|---|---|---|
| | No. of occur. | Prob. | No. of occur. | Prob. | No. of occur. | Prob. |
| Green background color 210 | 200 | 80% | 150 | 60% | 25 | 10% |
| "blackjack" 220 | 238 | 95% | 13 | 5% | 13 | 5% |
| "the" 230 | 125 | 50% | 125 | 50% | 125 | 50% |

| Pages Rated \ Linked Pages | Sex Page | Gambling Page | Payment Page | Education Page | Government Page | Rating Result (e.g., category) |
|---|---|---|---|---|---|---|
| Web Page 1 | Yes | | Yes | | | Porn Page |
| Web Page 2 | | Yes | Yes | | | Gambling Page |
| Web Page 3 | Yes | | Yes | Yes | | Sex Education Page |
| Web Page 4 | Yes | Yes | | | Yes | News Page |
| ... | ... | ... | ... | ... | ... | ... |
| Web Page N | | | Yes | | | Shopping Page |

Fig. 7

LINK-BASED CONTENT RATINGS OF PAGES

FIELD OF THE INVENTION

The present invention relates generally to a content rating of pages. More particularly, this invention relates to a link-based content rating of pages.

BACKGROUND OF THE INVENTION

Today, various content filtering mechanisms are provided to entities to manage and/or control user access to the Internet via facilities provided by the entities. For example, a company typically implements some forms of content filtering mechanisms to control the use of the company's computers and/or servers to access the Internet. Access to content within certain predetermined categories using the company's computers and/or servers may not be allowed during some predetermined periods of time.

A typical content filtering client, which typically resides in a firewall, sends a request for the content rating of a web page in response to each web page browsed. The content rating requests are routed to a separate content rating server. When the content rating server receives a request, the content rating server retrieves the content rating for that request from a database and sends the content rating to the content filtering client.

Based on the content rating retrieved, the content filtering client determines whether the user is allowed to access the web page. If the user is allowed, the content filtering client passes the web page. Otherwise, the content filtering client blocks the web page.

To build the database of content ratings (hereinafter referred to as ratings) used in content filtering, one conventional way is to have a number of workers manually browsing a number of web pages (e.g., Web crawling) to evaluate the content of the web pages. Then the workers assign a content rating to each web page evaluated. The content ratings are stored in the database. Although this type of rating is generally highly accurate, it takes a long time to rate web pages manually. Furthermore, the problem is worsened due to the large number of web pages available over the Internet.

Another existing way to rate web pages is to scan the text in the web pages for keywords or key phrases and evaluate the web pages based on the presence or absence of certain keywords or key phrases. This mechanism can be automated using servers or computing devices well known in the art, and hence, is faster than the manual evaluation discussed above. However, this mechanism suffers from lower accuracy in the ratings resulted. For example, this mechanism may classify a web page having the keyword "breast" in the pornography category. However, medical web pages discussing breast cancer may also be inadvertently classified as pornography because of the use of the word "breast." Furthermore, content rating is typically limited to the content within a document or Web page.

SUMMARY OF THE INVENTION

Methods and apparatuses for link-based content ratings for pages are described herein. According to one embodiment, statistics for each of multiple pages is determined with respect to one or more predetermined categories based on the content rating of each of the pages. For each of the categories, a set of primary pages having relationships (e.g., links) with one or more secondary pages is selected, where the selected pages probabilistically distinguish from relationships with other pages.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 2 is a diagram illustrating an exemplary token-based vector according to one embodiment of the invention.

FIG. 7 is a diagram illustrating an exemplary link-based vector according to one embodiment.

DETAILED DESCRIPTION

Methods and apparatuses for link-based content ratings for Web pages are described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Exemplary Token-Based Content Rating

A typical assumption of a rating system is that Internet contents of similar categories exhibit similar statistical patterns, and those of different categories exhibit differentiable patterns. Similar assertions have been made in other fields, such as spam filtering, and have proven to be largely correct. However, the content rating problem is much harder because of our desire to classify contents into many categories, rather than typically two categories in spam filtering (e.g., spam and non-spam).

According to one embodiment, a set of Internet pages with known categories, also referred to as a training set, is prepared. This set of pages can be obtained in a variety of ways, for example, via human intervention or Web crawling, etc. This set may contain enough pages for each category that are used to classify subsequent pages. For each of the languages, the larger the training set, the better. The quality of this method depends on the accuracy of this training set.

According to one embodiment, each training set is divided into language tokens. During this process, a language recognition algorithm may be applied. The statistics of the occurrences of each token may be calculated for each language and each category. When the training set is large enough, the significant tokens of any category are expected to be encountered in these pages. One of the advantages of this statistical method is that humans are not necessarily involved in deciding whether a token is significant or should be included. At this stage, for each token, one can compute the probability that a page containing that token belonging to a particular category for that language. In one embodiment, the probability may be calculated according to a predetermined formula, which will be described in details further below.

Figure 1:
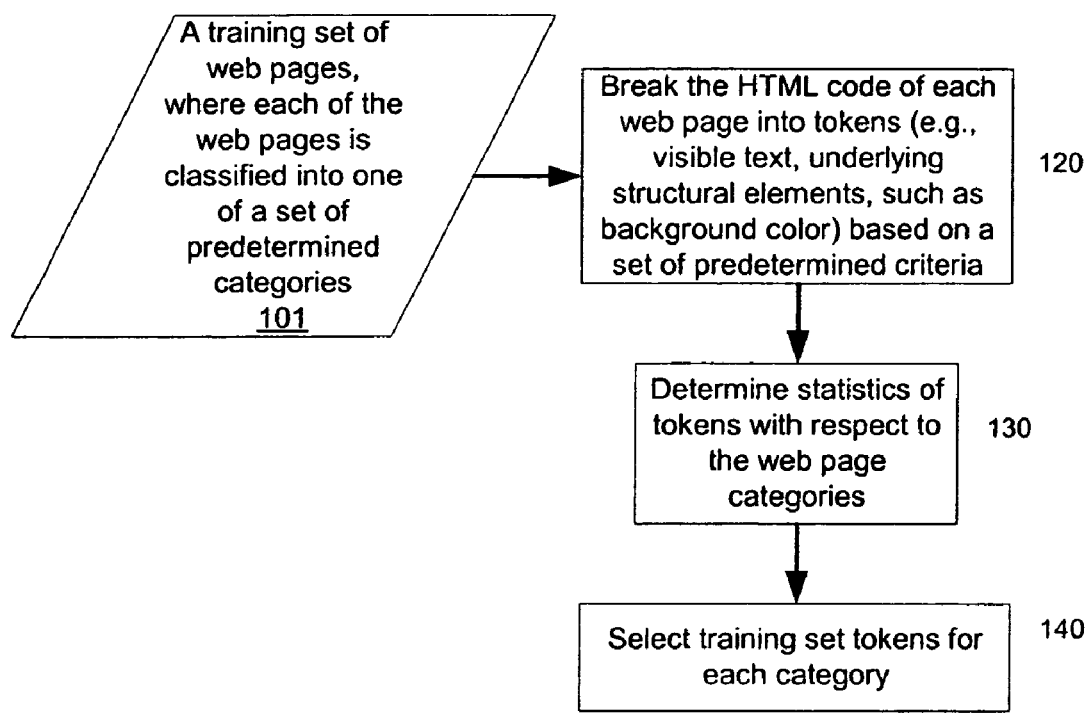
FIG. 1 is a flow diagram illustrating an exemplary process for training a token set for rating a page according to one embodiment.

FIG. 1 is a flow diagram illustrating an exemplary process for training a token set for rating a page according to one embodiment. The exemplary process 100 may be performed by processing logic that may include hardware (e.g., circuitry, dedicated logic, etc.), software (such as is run on a general-purpose computer system, a server, or a dedicated machine), or a combination of both. For example, exemplary process 100 may be performed by a content rating facility or engine, which may reside within a server (e.g., a Web server), a network appliance device (e.g., a dedicated server), or a network access device (e.g., a gateway, switch or router, etc.)

Note that throughout this application, content rating of Web pages is described as examples according to certain embodiments of the invention. It will be appreciated that other types of documents (e.g., word processing documents or images) may also be applied.

According to one embodiment, each of multiple web pages as a training set is classified into one or more predetermined categories based on content of the corresponding web page. The mark-up language code of each of the web pages is divided into one or more tokens based on one or more predetermined criteria. The statistics of each of the tokens are determined with respect to each of the predetermined categories. For each of the predetermined categories, a set of tokens that probabilistically distinguish from the other categories is selected as a trained set.

Referring to FIG. 1, a training set of web pages 101 is provided. The training set of web pages include at least one web page belonging in each of a predetermined set of categories, such as sports, gambling, news, shopping, etc. In one embodiment, each of the training set web pages is classified manually into one or more of the predetermined categories. Alternatively, the training set web pages may be classified automatically using some processing logic, such as software running on a server, a personal computer, a dedicated machine, etc. Other alternatives are possible as well (e.g., various combinations of manual classifying and automatic classifying by processing logic, etc.).

The content of each training set web pages is broken into tokens based on a set of criteria (processing block 120). In one embodiment, the content of the training set web pages includes Hypertext Mark-up Language (HTML) code, for example, including one or more HTML tags. Processing logic may break the HTML code into tokens using a predetermined set of criteria. In one embodiment, the HTML code is broken based on a predetermined set of delimiters appearing in the HTML code. Different embodiments of the invention may use different sets of delimiters; similarly, a given embodiment may use different sets of delimiters for different circumstances (e.g., different languages, different target applications, etc.). In one embodiment, the set of delimiters used for web pages in English may include some or all of keyboard characters (e.g., "(", ")", "<", ">", ";", "|", "^", numerical digits, etc.), except the alphabetic letters (e.g., a, b, c, etc.). Different embodiments may use combinations of characters as the delimiters. In one embodiment, a token (e.g., also referred to as a keyword or a term) may be defined as the HTML code in between every two delimiters, where the token does not include any delimiter. As a result, the tokens may include visible text strings and/or underlying structures of the web pages, such as the background color of the web pages. Furthermore, different training sets and different tokens may be used for rating web pages in different languages, such as English, Russian, French, Japanese, etc. In the following discussion, web pages in English are used as examples. However, it should be appreciated that the technique disclosed is applicable to web pages in other languages as well.

The statistics of the tokens are determined with respect to each of the categories (processing block 130). In one embodiment, processing logic counts the number of occurrences of each token in a category. Based on the number of occurrences of a token in a category, processing logic may determine the probability of how likely a web page in which the token appears belongs to the category. Alternatively, processing logic may determine the probability of how likely a web page that lacks the token belongs to the category.

In one embodiment, processing logic identifies tokens that appear in every category or most categories of web pages, such as, for example, "the", "an", etc. Since these tokens appear in every category or most categories, the presence or absence of these tokens in the HTML code of a web page does not make the web page more or less likely to belong to any category. Therefore, processing logic may cancel out these tokens.

In one embodiment, processing logic identifies tokens that appear or do not appear in the HTML code of web pages in a limited number of categories. Since these tokens are associated with only the limited number of categories, the presence or absence of these tokens in the HTML code of a web page tends to be indicative of whether the web page belongs to one of the limited number of categories. For example, the text string, "blackjack", appears mostly in gambling web pages, but not in web pages in other categories. Therefore, a web page having the token corresponding to the text string "blackjack" is likely to be in the gambling category. Thus, processing logic may assign a probability of 95% to the token corresponding to the text string "blackjack" with respect to the gambling category. Another exemplary token is the token associated with a green background color. Web pages having a green background color are likely to be in the gambling category because gambling web pages typically mimic the look and feel of gambling tables, which usually have green table tops. However, web pages directed to golfing may adopt a green background color as well in order to mimic the look and feel of golf courses. Therefore, processing logic may assign a smaller probability, such as 80%, to the token corresponding to the green background color with respect to the gambling category.

After determining the statistics of the tokens, the tokens to be included in a training set for each category are selected (processing block 140). These selected tokens are hereinafter referred to as the "training set tokens." The training set tokens selected for each category are related to probabilistically distinguishing that category from the other categories. In one embodiment, a predetermined threshold (e.g., 50%) is set such that only tokens having a probability greater than or equal to the threshold are selected to be a training set token for a certain category. In one embodiment, the predetermined thresholds of >60% and <40% are set. In an alternative embodiment, predetermined thresholds of >90% and <10% are set. Of course, other embodiments may use other thresholds and/or relationship of the tokens and statistics.

FIG. 2 is a diagram illustrating an exemplary token-based vector according to one embodiment of the invention. The sample training set of different categories of web pages may include different numbers of web pages in different embodiments. Furthermore, the number of training set web pages used in each category may or may not be the same in some embodiments. In the current example, the training set includes 250 web pages in each category. The first token 210 is a token associated with a green background color. As discussed above, both gambling web pages and golfing web pages are likely to have green backgrounds. There may be 200 occurrences of a gambling web page having a green background in the training set. Thus, a probability of 200/250=80% may be assigned to the green background color token 210 with respect to the gambling category. However, since the sports category includes web pages directed to other types of sports in addition to golfing, the number of occurrences of the green background in web pages in the sports category is lower than that in the gambling category. For example, there may be only 150 sports web pages having a green background. As a result, a smaller probability, 150/250=60%, may be assigned to the green background token with respect to the sports category. Finally, a green background is typically not used in news web pages. For example, there may be only 25 news web pages having a green background among the training set web pages. Thus, a smaller probability, 25/250=10%, may be assigned to the green background token with respect to the news category.

Referring to FIG. 2, the second exemplary token is the text string "blackjack" 220. As discussed above, "blackjack" appears mostly in only gambling web pages, but not web pages in other categories. For example, there may be 238 gambling web pages having the word "blackjack," 13 sports web pages having the word "blackjack," and 13 news web pages having the word "blackjack." Thus, a high probability (e.g., 95%) may be assigned to "blackjack" with respect to the gambling category. However, "blackjack" rarely appears in either the sports category or the news category. Therefore, a low probability (e.g., 5%) may be assigned to the token "blackjack" 220 with respect to the sports category and the news category.

The third exemplary token is the text string "the". It is commonly known that "the" appears in almost every English web page. For example, "the" may appear in 125 web pages in the training set of each category. Thus, it is not useful to determine the probability that a web page belongs to a certain category based on the statistics of the token "the" with respect to the category. In other words, "the" may be considered as a neutral token, and hence, a probability of 50% may be assigned to "the" with respect to each category. Moreover, the token "the" may not be selected as a training set token. In other alternative embodiments, different percentages and/or values (e.g., values between −100 and +100, etc.) may be assigned to represent the probability that a web page belongs to a certain category given the presence or absence of a token in the web page.

Figure 3:
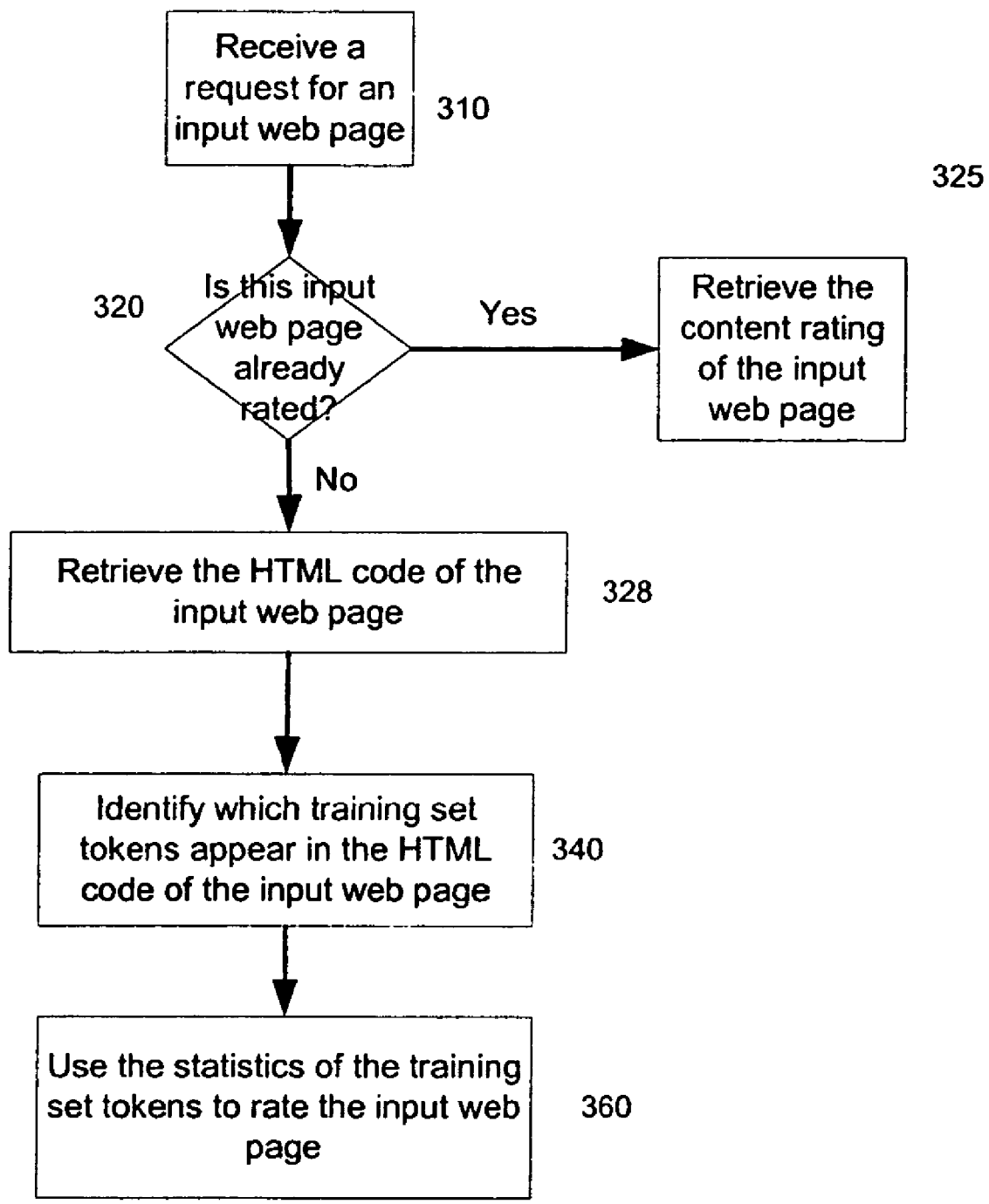
FIG. 3 is a flow diagram illustrating an exemplary process for processing an input page using token-based rating according to one embodiment of the invention.

FIG. 3 is a flow diagram illustrating an exemplary process for processing an input page using token-based rating according to one embodiment of the invention. The process is performed by processing logic that may comprise hardware (e.g., circuitry, dedicated logic, etc.), software (such as is run on a general-purpose computer system or a dedicated machine), or a combination of both.

Referring to FIG. 3, processing logic receives a request for an input web page (processing block 310). Then processing logic determines whether the input web page has already been rated (processing block 320). If the input web page has already been rated, then processing logic retrieves the content rating of the input web page, locally or remotely, from a storage device, such as a cache or a database (processing block 325).

If the input web page has not been rated yet, then processing logic retrieves the HTML code of the input web page (processing block 328). Processing logic identifies which training set tokens appear in the HTML code of the input web page (processing block 340). In one embodiment, processing logic breaks the HTML code of the input web page into tokens based on the set of predetermined criteria used in breaking the HTML code of the training set of web pages as discussed above with reference to FIG. 1. Processing logic may take various actions to process the training set tokens identified in the input web page, such as counting the occurrences of the training set tokens appearing in the input web page, etc.

Using the statistics of the training set tokens and the identified ones of those tokens, processing logic rates the input web page (processing block 360). In one embodiment, processing logic uses the probability of the training set tokens with respect to each category to calculate a probability that the input web page belongs to the corresponding category. Then processing logic may simply classify the input web page in the category associated with the largest probability calculated. Alternatively, processing logic may determine the difference between the probabilities and classifies the input web page to be in a certain category if the probability associated with the category is greater than the rest of the probabilities by at least a predetermined margin. Furthermore, if processing logic cannot classify the input web page into any single category based on the training set tokens' statistics, processing logic may take a variety of actions (e.g., return an error message to alert an administrator, provide an option to allow the administrator to manually rate the input web page or to use other mechanisms to rate the web page, request a rating for an external source, etc.).

The techniques discussed above may be implemented in various embodiments of a networked system. Some exemplary embodiments are discussed below to illustrate the concept. However, one should appreciate that the invention is not limited to the configurations in the following embodiments. For example, the token-based rating engine may run on a dedicated machine or on different devices within the system, such as the content filtering module, the server, etc. Furthermore, the token-based rating engine may rate web pages in real time and/or at the back end. Moreover, the handling of web pages that have to be rated may vary from system to system. Likewise, the timing for when to access a server and when to access a token-based rating engine may vary from system to system.

Exemplary Content Rating Systems

Figure 4:
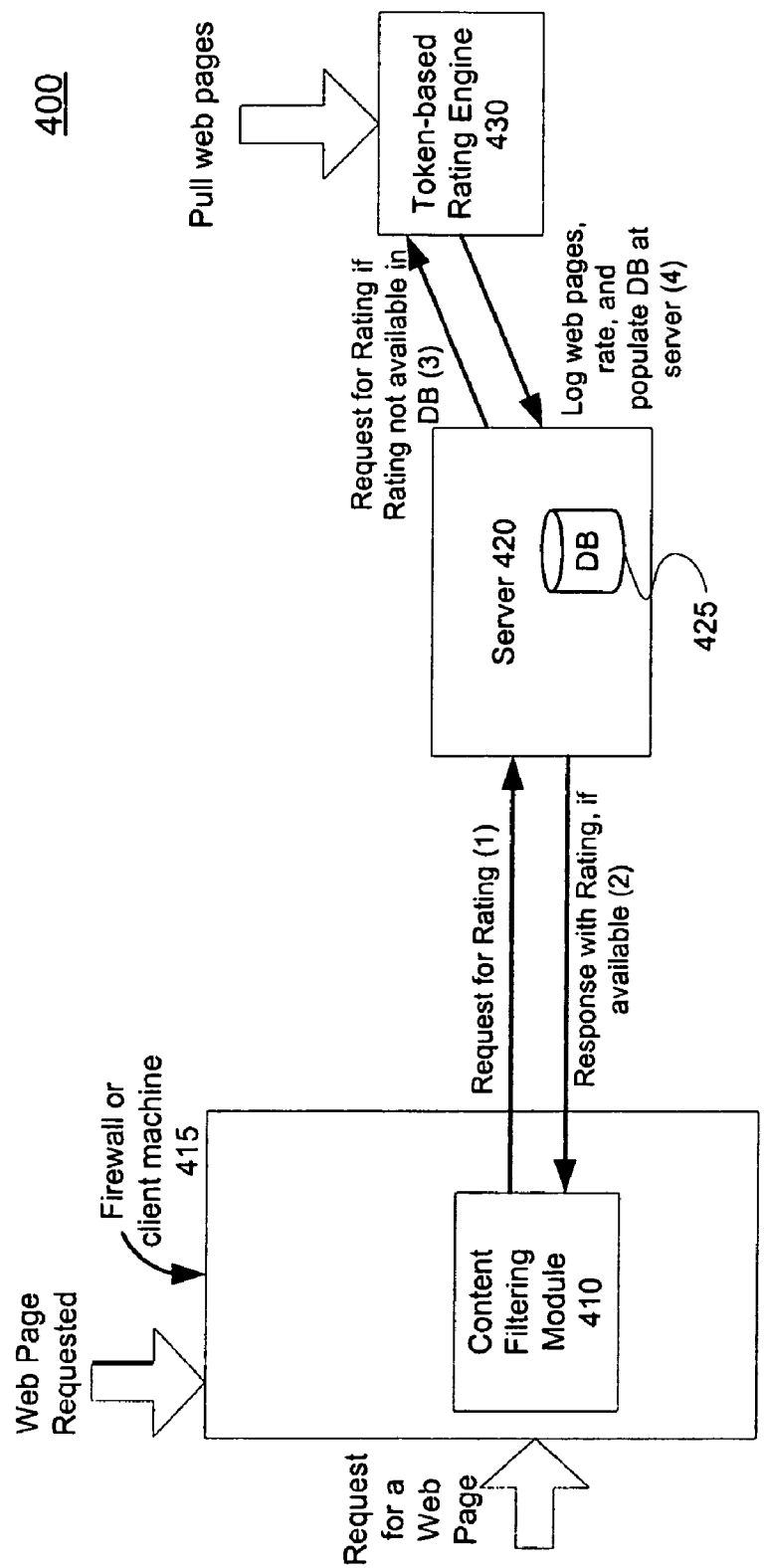
FIG. 4 is a block diagram illustrating an exemplary rating system according to one embodiment of the invention.

FIG. 4 is a block diagram illustrating an exemplary rating system according to one embodiment of the invention. The system 400 includes a content filtering module 410, a server 420, a database 425, and a token-based rating engine 430. The content filtering module 410 may be operable to run on one of a firewall, a proxy, and a client machine 415 (e.g., a personal computer, a workstation, etc.). The content filtering module 410 is communicably coupled to the server 420. The server 420 is also communicably coupled to the token-based rating engine 430. The database 425 has stored therein the ratings of web pages already rated. The database 425 may be within the server 420 as shown in FIG. 4. Alternatively, the database 425 may be a separate unit communicably coupled to the server 420.

Note that any or all of the components and the associated hardware illustrated in FIG. 4 may be used in various embodiments of the system 400. However, it should be appreciated that other configurations of the system 400 may include more or less devices than those shown in FIG. 4.

The token-based rating engine 430 uses the training set tokens and their statistics to rate web pages. While in some embodiments, the training set and statistics are provided to the token-based rating engine 430, in other embodiments, the training set and statistics are generated as discussed in FIG. 1 by the token-based rating engine 430.

In one embodiment, the content filtering module 410 sends a request for rating (1) to the server 420 when the content filtering module 410 receives a request for a web page. In response to the request (1), the server 420 checks the database 425 for the rating. If the rating is available in the database 425, the server 420 retrieves the rating from the database 425 and sends the rating to the content filtering module 410 with a response (2). Otherwise, the server 420 may send a response (2) without rating to the content filtering module 410 and may send a request (3) for the rating to the token-based rating engine 430. In one embodiment, the token-based rating engine 430 pulls the corresponding web page and performs token-based rating on the corresponding web page as described above with reference to FIG. 3. After rating the corresponding web page, the token-based rating engine 430 may return the rating (4) to the server 420 to log the corresponding web page, the rating, and to populate the database 425 with the rating. Therefore, next time the server 420 receives a request for the rating of the same web page, the server 420 would have the rating available in the database 425.

If the content filtering module 410 receives the response (2) without the rating, the content filtering module 410 may take a variety of actions. For example, it may pass the web page. When the same web page is requested again, the database 425 would have the rating available because the web page would have been rated by then as discussed above. As another example, the content filtering module 410 may block the web page, thereby requiring the user to request it until a rating is available.

Alternatively, the server 420 may request the token-based rating engine 430 to rate the web page in real time. The server 420 may wait until the token-based rating engine 430 completes rating the web page and sends the rating to the server 420 before the server 420 sends the response (2) with the rating to the content filtering module 410. In such a system, the content filtering module 410 may be implemented to wait for a predetermined period for a response from the server 420. If the predetermined period expires and the server 420 has not sent a response with the rating to the content filtering module 410 yet, the content filtering module 410 may take a variety of actions (e.g., pass the web page, block the web page, etc.).

Figure 5A:
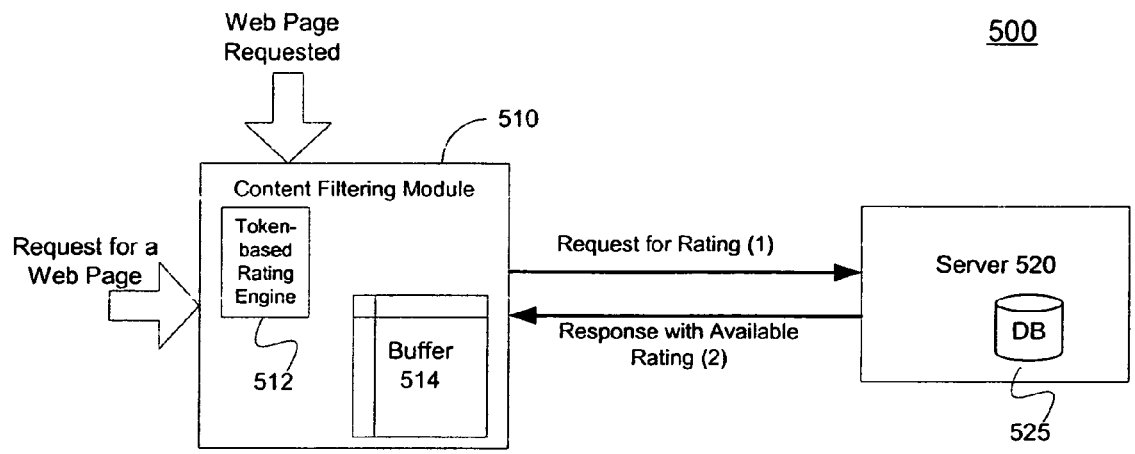
FIGS. 5A and 5B are block diagrams exemplary rating systems according to certain embodiments of the invention.
Figure 5B:
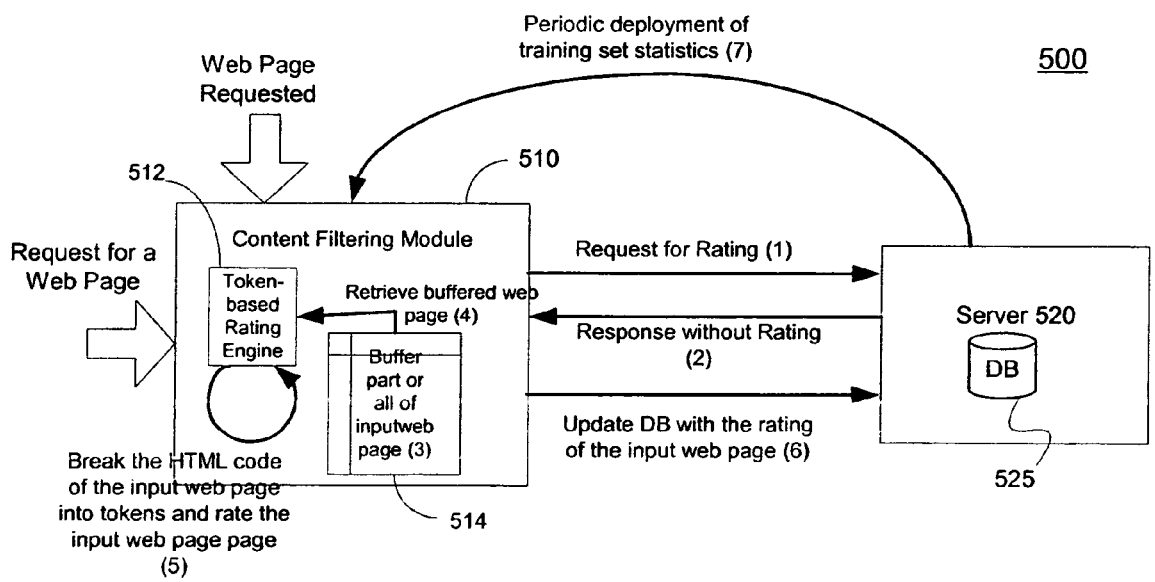

FIGS. 5A and 5B illustrate an alternate embodiment of a system usable with the invention. The system 500 includes a content filtering module 510, a database 525, and a server 520. The content filtering module 510 is communicably coupled to the server 520. In one embodiment, the content filtering module 510 includes a token-based rating engine 512 and a buffer 514. The database 525 may be within the server 520 as shown in FIGS. 5A and 5B. Alternatively, the database 525 may be a separate unit communicatively coupled to the server 520.

Note that any or all of the components and the associated hardware illustrated in FIGS. 5A and 5B may be used in various embodiments of the system 500. However, it should be appreciated that other configurations of the system 500 may include more or less devices than those shown in FIGS. 5A and 5B.

Various embodiments may populate the database 426 differently (e.g., token-based rating, manually, keywords, combinations thereof, etc.). Also, various embodiments may provide the initial training set and statistics to the token-based rating engine 512 differently (e.g., from the server 520, from a separate server, preinstalled, etc.) and may optionally provide updates (7) (e.g., from server 520, from a separate server, etc.).

When the content filtering module 510 receives a request for a web page, the content filtering module 510 sends a request (1) for the rating of the web page to the server 520. In response to the request (1), the server 520 checks the database 525 for the rating. If the rating is available in the database 525, the server 520 retrieves the rating and sends the rating with a response (2) to the content filtering module 510 as shown in FIG. 5A.

In some embodiments, the content filtering module 510 pulls the web page substantially simultaneously with the sending of the request (1) for the rating. If the web page arrives at the content filtering module 510 after the rating arrives, the content filtering module 510 may determine whether to pass the web page based on the rating. However, if the web page arrives at the content filtering module 510 before the rating arrives, the content filtering module 510 may hold the web page until the rating arrives and then determine whether to pass the web page held based on the rating. In some embodiments, if the rating does not arrive within a predetermined period, the content filtering module 510 take a variety of actions (e.g., pass the web page, block the web page, etc.).

Referring to FIG. 5B, if the rating is not available in the database 520, the server 520 may return a response (2) to the content filtering module 510 without the rating. When the content filtering module 510 receives the response (2) without the rating, the content filtering module 510 uses the token-based rating engine 512 to rate the web page. As described above, the content filtering client 510 may have pulled the web page substantially simultaneously with sending the request (1) for the rating. All or part of the web page pulled may be stored in the buffer 514 temporarily (3). In one embodiment, the token-based rating engine 512 retrieves the stored web page from the buffer 514 (4) and breaks the HTML code of the web page into tokens (5). As discussed above, the token-based rating engine 512 may periodically receive the statistics of some training set tokens (7). The token-based rating engine 512 may match the tokens of the web page against the training set tokens and rate the web page using the statistics of the training set tokens that also appear in the HTML code of the web page.

In some embodiments, the token-based rating engine 512 rates the web page in real time and the content filtering module 510 holds the web page until the rating is available and the content filtering module 510 can determine whether the web page can be passed. Alternatively, if the token-based rating engine 512 does not complete rating the web page within a predetermined period, the content filtering module 510 may go ahead to pass the web page in order to keep the web page retrieval latency below a predetermined limit.

When the server lacks a rating for a web page, the rating to be stored in the server (which may differ from the real time rating that could be produced by the token-based engine 512), may be obtained in a variety of ways. For example, it may be obtained as described with reference to FIG. 4. Alternatively, it may be logged and obtained manually. As another alternative, it may be obtained from the token-based rating engine 512. Specifically, once the token-based rating engine 512 determines the rating of the web page, the content filtering module 510 sends the rating to the server 520 to update the database 525 with the rating (6). Hence, the next time a request for the same web page is received, the content filtering module 510 or others can receive the rating from the database 525 without rating the web page again. In some embodiments, the rating may be stored with a predetermined time-to-live (TIL) parameter in the database 525 such that web pages that have been rated before a predetermined period have to be rated again because the content of the web pages may change over time, and thus, the old rating may have become obsolete.

In one embodiment, the content filtering module (e.g., 410 and/or 510) may include a cache (a local storage device that may include any of various types of machine readable media, such as, for example, random access memory (RAM), dynamic random access memory (DRAM), flash memory, etc.). Recent ratings are stored in the cache (e.g., from the server, from the on-board token-based rating engine, etc.). As the web page is being pulled, the content filtering module may check the cache to see if the rating of the web page is available in the cache. If the rating is available in the cache, then the content filtering module may use the rating from the cache to determine whether to pass the web page.

Furthermore, in some embodiments, the rating may be stored with a predetermined TTL parameter such that web pages that have been rated before a predetermined period have to be rated again to ensure the rating is current.

Exemplary Link-Based Content Rating

According to certain embodiments of the invention, the techniques described above may also be applied to a Web page having one or more links linking with other Web pages. In this situation, each of the linked Web pages is accessed via the respective link and rated using in part the above described techniques and a final rating of the Web page is determined based in part on the rating of the linked Web pages.

Similar to the token-based contenting rating, prior to rating a Web page having one or more linked pages, a training set of Web pages may be prepared according to one or more predetermined categories. In one embodiment, for each page of the training set, all of the links, such as URL (universal resource locator) links, are identified from the respective page, also referred to as a primary page. For each page linked with the primary page, also referred to as a secondary page, the respective secondary page is categorized into one or more of the predetermined categories. As a result, a vector of linked-to categories, also referred to as a linking vector, is generated similar to the one shown in FIG. 7.

In one embodiment, the statistic characteristics of the linking vector may be calculated for each language and/or each category. When the training set is large enough, these linking vectors will exhibit statistically significant patterns to categorize future pages. One of the advantages of this approach is that humans are not necessarily involved in deciding whether a linking pattern is significant or not. At this stage, for each linking vector, one can compute the probability that a page exhibiting that linking pattern belongs to a particular category for that language.

Figure 6:
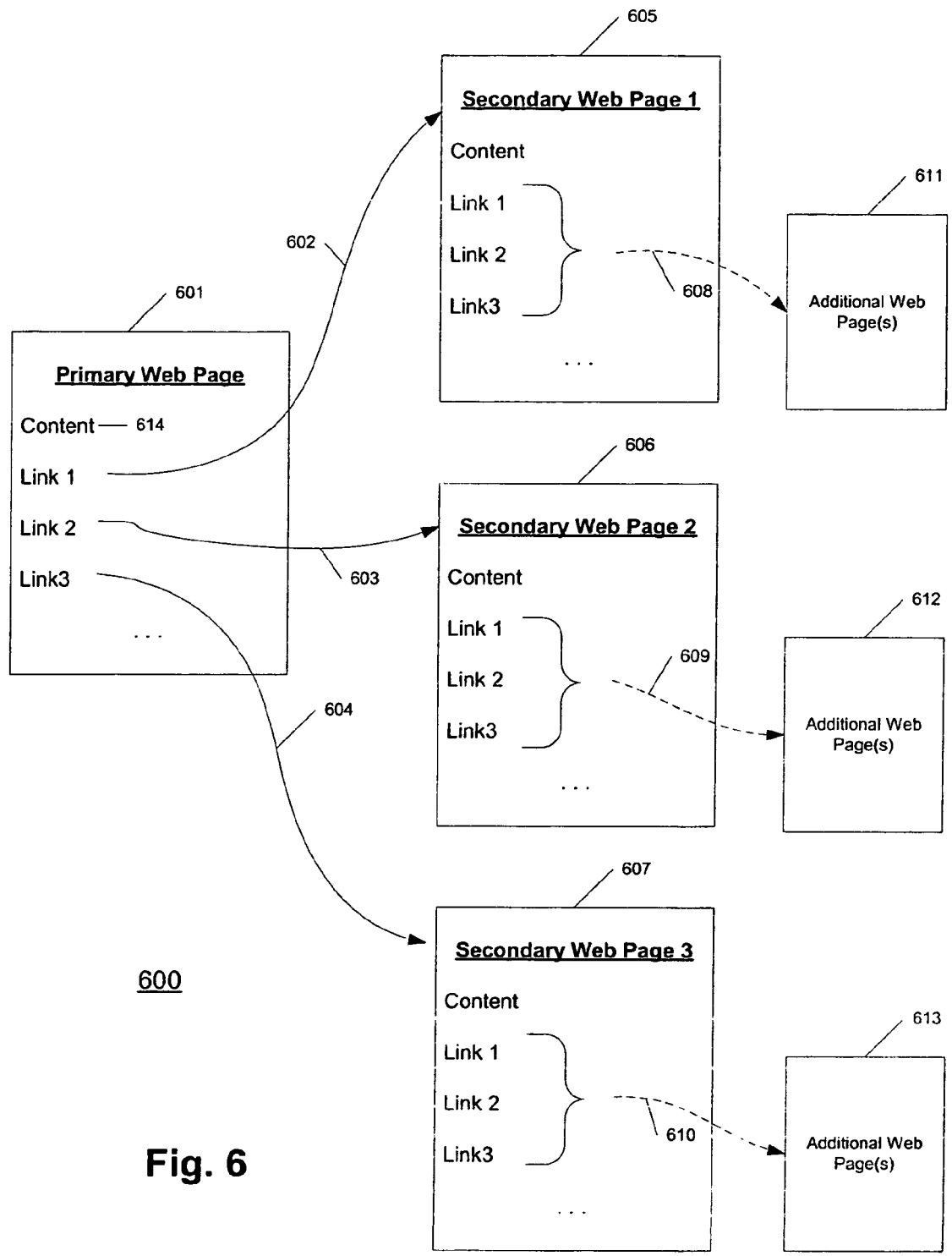
FIG. 6 is a block diagram illustrating exemplary configuration for link-based content rating according to one embodiment.

FIG. 6 is a block diagram illustrating exemplary configuration for link-based content rating according to one embodiment. In one embodiment, referring to FIG. 6, exemplary configuration 600 includes, a primary page 601 having one or more links 602-604, in addition to its normal content. The links 602-604 are linked to secondary pages 605-607 respectively. In one embodiment, at least one of the links 602-604 is a URL (universal resource locator) compatible link lining with an additional page, which when it is activated, a respective linked page is accessed. In addition, some or all of the secondary pages 605-607 may include further links 608-610 linking with additional pages 611-613. It will be appreciated that some or all of the additional pages 611-613 may further includes additional links linking with other pages and so on.

In one embodiment, some or all of the pages 601, 605-607, and 611-613 may be used as a part of a training page set, which may be used to rate a future page. Alternatively, page 601 may be a page dynamically rated if it has not been rated previously (e.g., within the training set or found in a database). In order to rate the primary page 601, according to one embodiment, in addition to rating content 614 of page 601, each of the secondary pages 605-607 linked with the page 601 via links 602-604 (and pages 611-613 if there is any) may be rated, for example, using the token-based content rating techniques described above. The final rating of the primary page 601 may be determined based on the rating of its content 614 and the rating of some or all of the linked pages (e.g., pages 605-607 and/or pages 611-613).

If the pages of FIG. 6 are used for training a set of training pages, the rating information of the primary and secondary pages, as well as their relationships may be stored in a database as a linking vector, similar to exemplary linking vector 700 shown in FIG. 7. As described above, certain types of pages linked with a target page may categorize the target page into one or more predetermined categories. For example, referring to FIG. 7, when Web page 1 includes one or more links linking with a sex page and a payment page, Web page 1 is more likely categorized as a pornography page. However, not all of the sex pages are related to pornography. For example, Web page 3 linking with a sex page, a payment page, and an educational page may be a sex education related page. The rating of a Web page may be determined based on probabilities of occurrence of some or all linked pages, according to a predetermined formula, which will be described in details further below.

Figure 8A:
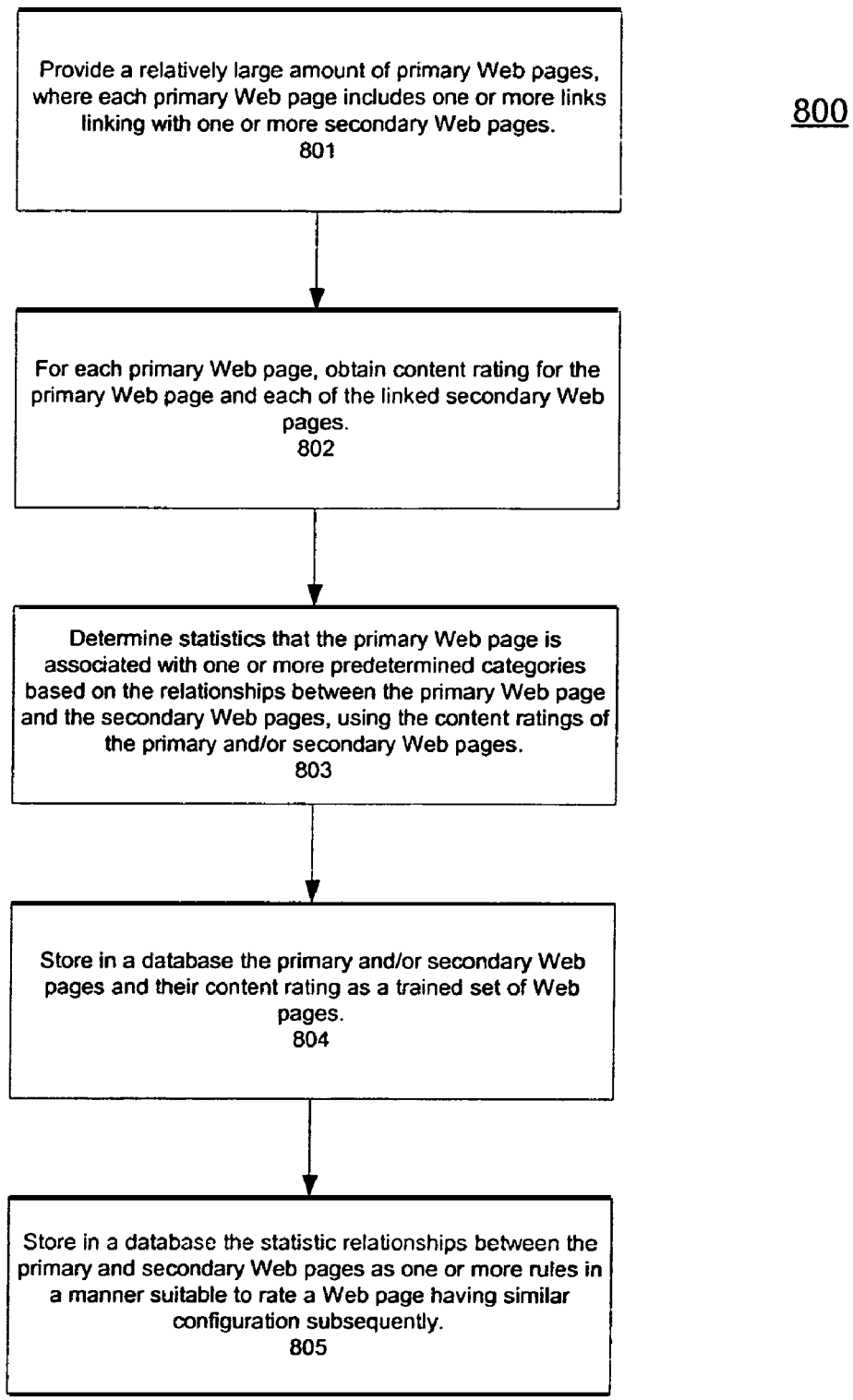
FIG. 8A is flow diagram illustrating an exemplary process for training a page set to content rating according to one embodiment.

FIG. 8A is a flow diagram illustrating an exemplary process for training a page set to content rating according to one embodiment. The exemplary process 800 may be performed by processing logic that may include hardware (e.g., circuitry, dedicated logic, etc.), software (such as is run on a general-purpose computer system, a server, or a dedicated machine), or a combination of both. For example, exemplary process 800 may be performed by a content rating facility or engine, which may reside within a server (e.g., a Web server), a network appliance device (e.g., a dedicated server), or a network access device (e.g., a gateway, switch or router, etc.)

In one embodiment, exemplary process 800 includes, but is not limited to, determining statistics for each of a plurality of Web pages with respect to one or more predetermined categories based on content rating of each of the Web pages, and for each of the predetermined categories, selecting a set of primary Web pages having relationships with one or more secondary Web pages that probabilistically distinguish from relationships with a remainder of the Web pages.

Referring to FIG. 8A, at block 801, a relatively large amount of primary pages is provided, where each of the primary pages includes one or more links linking with one or more secondary pages. At block 802, for each of the primary pages, the content rating for the content of the primary and secondary pages are obtained. In one embodiment, the content rating of the primary and secondary pages are obtained using the token-based content rating techniques described above. At block 803, the processing logic determines statistics that the primary page is associated with one or more predetermined categories based on the relationships between the primary page and the secondary pages, using the content rating of the primary and secondary pages. At block 804, the primary and second pages, as well as their content ratings are stored in a database, which may include multiple databases physically or logically and locally or remotely. At block 805, the relationships between the primary page and the secondary pages may be stored as one or more rules (e.g., similar to the linking vector 700 of FIG. 7) in a manner suitable to rate a future page having the similar pattern subsequently. Other operations may also be performed.

Figure 8B:
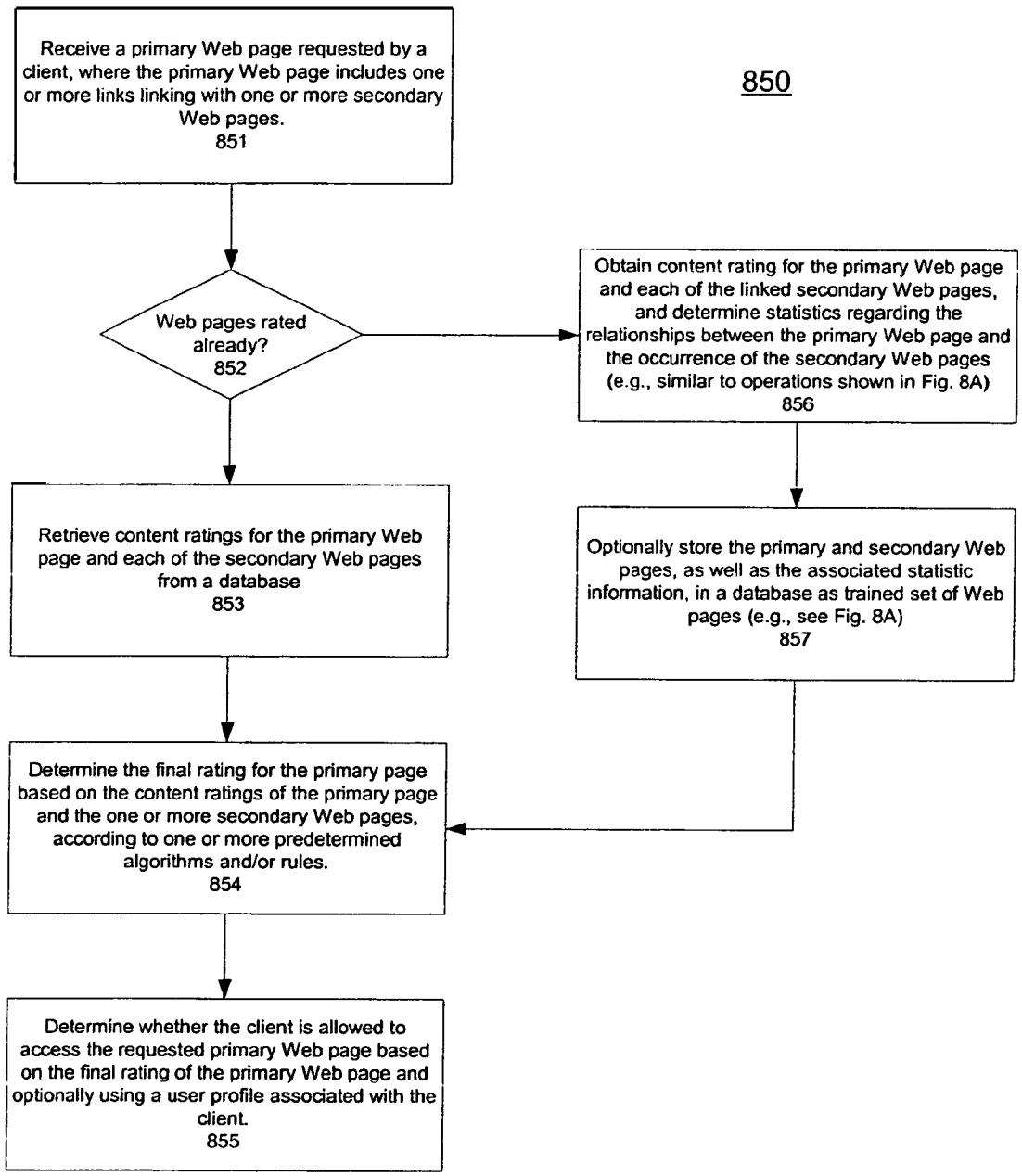
FIG. 8B is a flow diagram illustrating an exemplary process for training a page set to content rating according to one embodiment.

FIG. 8B is a flow diagram illustrating an exemplary process for training a page set to content rating according to one embodiment. The exemplary process 850 may be performed by processing logic that may include hardware (e.g., circuitry, dedicated logic, etc.), software (such as is run on a general-purpose computer system, a server, or a dedicated machine), or a combination of both. For example, exemplary process 850 may be performed by a content rating facility or engine, which may reside within a server (e.g., a Web server), a network appliance device (e.g., a dedicated server), or a network access device (e.g., a gateway, switch or router, etc.)

In one embodiment, exemplary process 850 includes, but is not limited to, in response to a first Web page requested from a client and the first Web page having one or more links linking with one or more second Web pages, accessing the one or more links of the first Web page to obtain the one or more second Web pages, accessing a database to obtain content rating for each of the second Web pages based on a trained set of Web pages, and determining a final rating for the first Web page based on the content rating of each of the second Web pages.

Referring to FIG. 8B, at block 851, a primary page requested by a client is received, for example, at a network access device, where the primary page includes one or more links (e.g., URL compatible links) linking with one or more secondary pages. At block 852, it is determined whether the primary page has been rated. In one embodiment, the processing logic accesses one or more databases to determine whether the one or more databases include rating for the primary and linked secondary pages (e.g., within the training set). If so, at block 853, the ratings of the content of the primary page and the secondary pages are retrieved from the databases. At block 854, a final rating for the primary page is determined based on the content ratings of the primary and secondary pages, according to one or more predetermined algorithms or rules. At block 855, base on the final rating of the pages, the processing logic determines whether the client is allowed to access the requested pages.

If it is determined at block 852 that any of the primary and secondary pages has not bee rated previously, at block 856, the content ratings of the unrated pages are obtained dynamically using the techniques described above. At block 857, the rated pages and their relationship information may be stored in the databases for future page rating. Other operations may also be performed.

Exemplary Algorithms for Content Rating

According to certain embodiments of the invention, a variety of algorithms may be used to determine the rating of the Web pages. In a particular embodiment, a Bayesian filtering method may be used in determining the likelihood that certain tokens would occur within a page or alternatively, the likelihood that certain other pages would be linked with a page.

Bayesian theorem is a way of quantifying uncertainty. Based on probability theory, the theorem defines a rule for refining an hypothesis by factoring in additional evidence and background information, and leads to a number representing the degree of probability that the hypothesis is true. Bayesian filtering techniques have been widely used in anti-spam areas. Bayesian filters are adaptable in that the filter can train itself to identify new patterns of spam and can be adapted by the human user to adjust to the user's specific parameters for identifying spam. Bayesian filters also are advantageous because they take the whole context of a page into consideration. For example, not every email with the word "cash" in it is spam, so the Bayesian filter identifies the probability of an email with the word "cash" being spam based on what other content is in the email, etc.

Bayesian weights and biases are calculated using the statistics from the training set and the human assigned value for the expected categories. The Bayesian method adjusts the weights and biases, to obtain revised values, based on the outcome of the evaluation of training page input using the current set of weights and biases. If the outcome is the correct response (e.g., the resulting category returned is indeed the correct category), then the current set of weights and biases are adequate for that input page. If the outcome is incorrect, the weights and biases are recalculated, using Bayes formula, to generate a new set of weights and biases that will return the correct category result for that page. This process is repeated until an acceptable level of incorrect categorization over the entire training set is achieved.

In one embodiment, the Bayesian formula used for token-based and/or link-based content rating may be defined as follows:

$$\sum_{s \in S} P_i(W \mid T, s) = \frac{P_i(W \mid s) P_i(T \mid W, s)}{P_i(T \mid s)}$$

The above example formula may be used in a token-based content rating, a link-based content rating, or a combination of both.

In one embodiment, during a token-based content rating process, for each sequence in the sample space (e.g., either from the training data or the Web page), a sum of Bayesian function probability is calculated based on the number of occurrence of the sequence in the training data for each category and in the Web page. Referring to the above formula, $P_i(X, s)$ is the probability at which a sequence (s) occurs in X, which a set of input pages for category (i). T is the set of training data. W is the Web page being categorized. S is the set of all sequences (s) that appear in the training data or the Web page.

According to another embodiment, during a link-based content rating process, for each linking vector in the sample space (e.g., either from the training data or the Web page), a sum of Bayesian function probability is calculated based on the number of occurrence of the linked-to category number in the training data for each category and in the Web page. Referring to the above formula, $P_i(X, s)$ is the probability at which a category number (s) occurs in X, which is a set of input pages for category (i). T is the set of training data. W is the Web page being categorized. S is the set of all category number (s) that appear in the training data or the Web page. Other configurations may exist.

Exemplary Network Configurations

Figure 9:
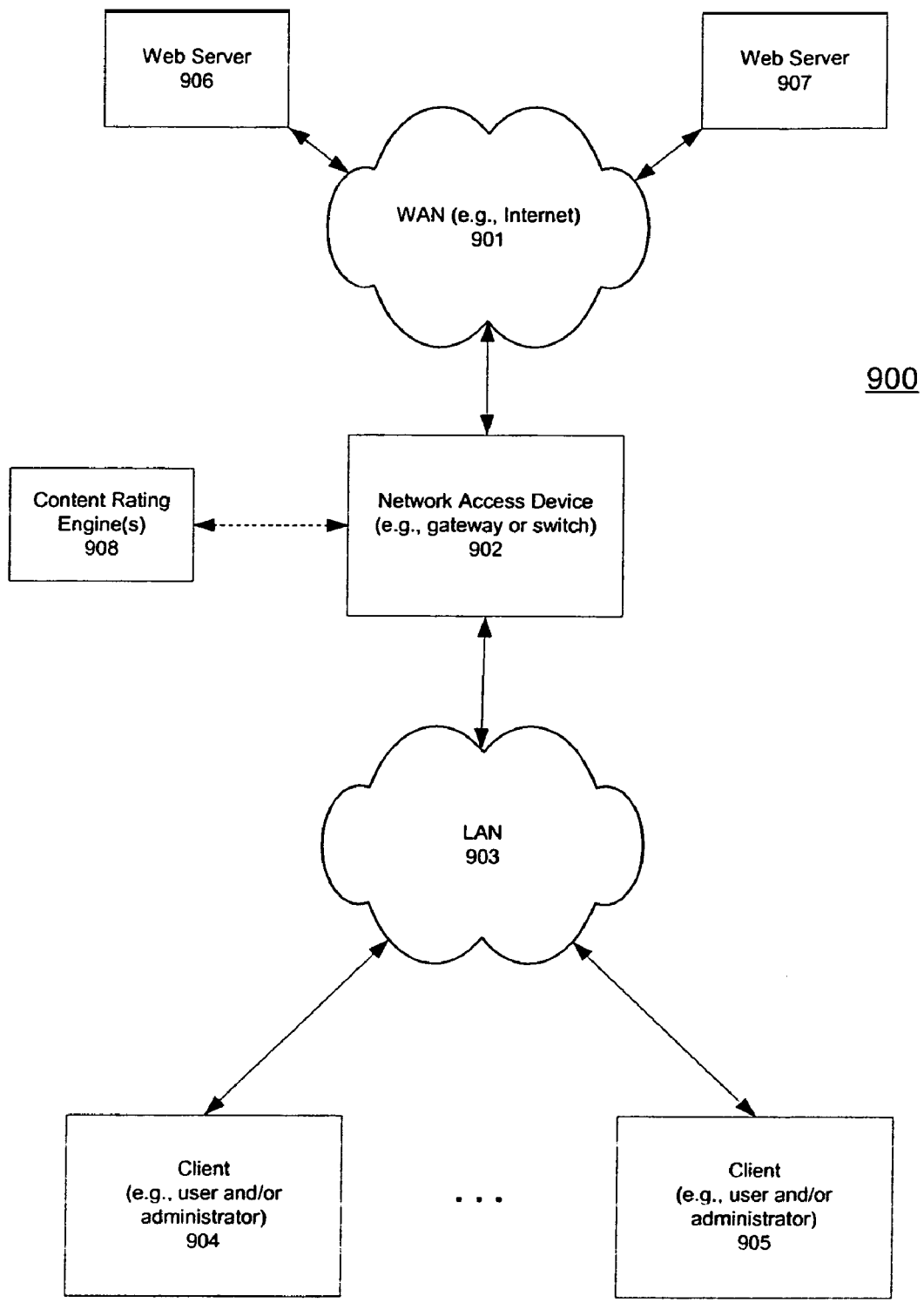
FIG. 9 is a block diagram illustrating an exemplary network configuration according to one embodiment.

FIG. 9 is a block diagram illustrating an exemplary network configuration according to one embodiment. Referring to FIG. 9, in one embodiment, the exemplary configuration 900 includes a network access device 902 providing network access services for one or more clients 904-905 over a local area network 903. In order to access a remote facility (e.g., Web servers 906-907) over an external network 901, each of the clients 904-905 has to go through the network access device 902 and optionally, a network service provider (e.g., an Internet service provider).

In one embodiment, the connection between the network access device 902 and the external network 901 may be a wired connection. Alternatively, such a connection may be a wireless connection; for example, a satellite or an IEEE 802.16 connection. The external network 901 may be a wide area network (WAN), such as, for example, the Internet. The LAN 903 may be a home network using an IEEE 802.1x compatible protocol. Alternatively, the LAN 903 may be a local network within an organization (e.g., an Intranet). The LAN 903 may be a wired or wireless network, or a combination of both, using a variety of network protocols, such as, Ethernet and/or IEEE 802.xx compatible protocols, such as, for example, Wi-Fi and/or Bluetooth protocols. Wireless connections may include both RF and non-RF links, for example, an IR link. Wired connections may include both electrical and non-electrical links, for example, fiber optic links.

According to one embodiment, when a Web page is received at the network access device 902, which may be requested by any one of the clients 904-905, the network access device may invoke a content rating engine 908 to perform token-based content rating, link-based content rating, or a combination of both on the received Web page. The Web page may be received from any one of the Web servers 906-907 and may or may not include one or more links (e.g., URL compatible links) linking with one or more additional Web pages, for example, from other Web sites. The operations involved in content rating on the Web page may be performed using at least one of the techniques described above. Based on a result of the rating, the network access device 902 may decide whether the requesting client is allowed to access the requested Web page, for example, based on a user profile associated with the client (e.g., parental control, etc.)

The content rating engine may include one or more engines (e.g., one for token-based rating and one for link-based rating, etc.) The content rating engine 908 may be implemented as a part of network access device 902. Alternatively, the content rating engine 908 may be implemented as a dedicated server within LAN 903, or a Web server coupled to the WAN 901. Other configurations may exist.

Figure 10:
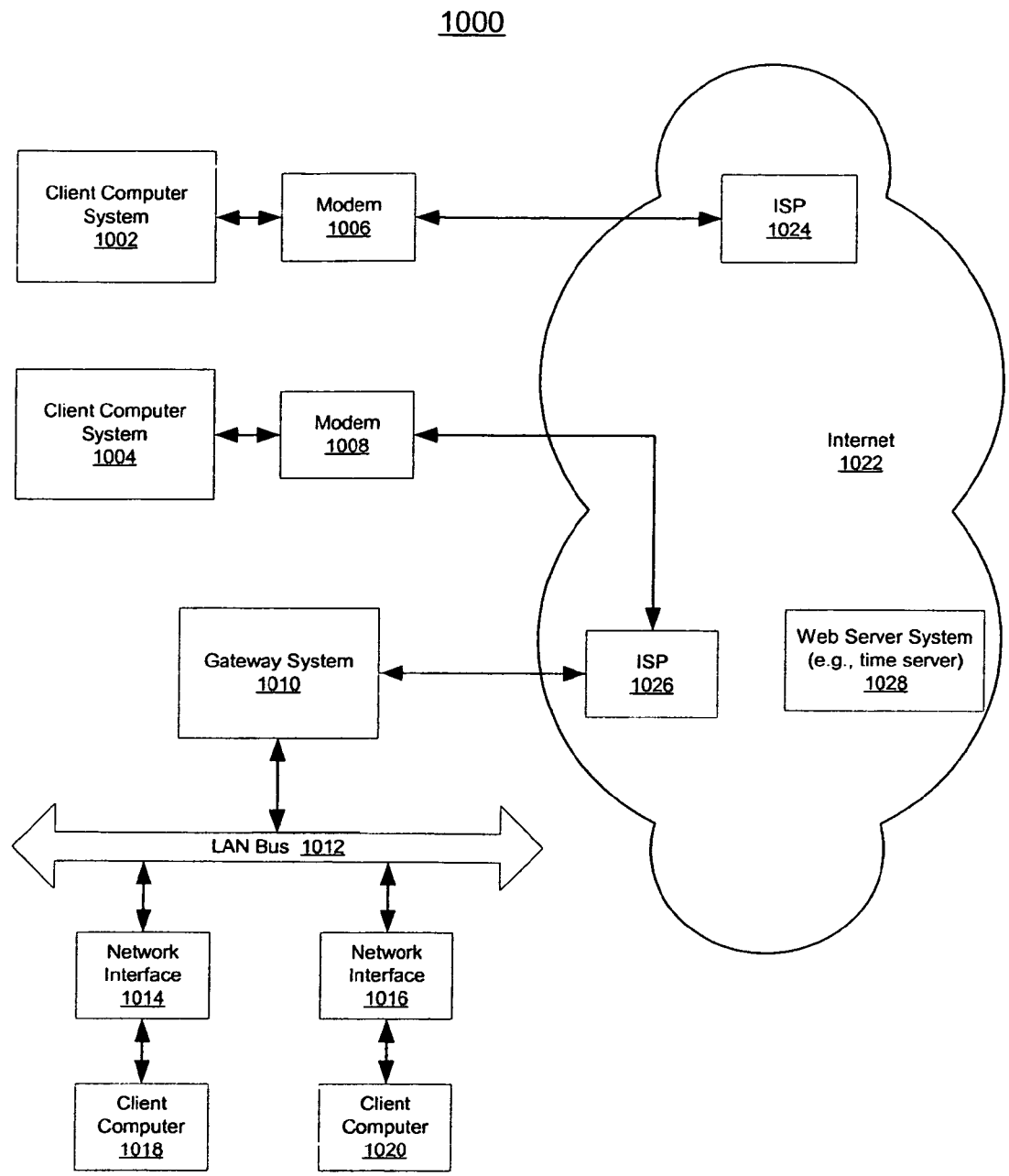
FIG. 10 is a diagram of a network of computer systems, which may be used with an embodiment of the invention.

FIG. 10 is a diagram of a network of computer systems, which may be used with an embodiment of the invention. As shown in FIG. 10, a network 1000 includes a number of client computer systems that are coupled together through an Internet 1022. It will be appreciated that the term "Internet" refers to a network of networks. Such networks may use a variety of protocols for exchange of information, such as TCP/IP, ATM, SNA, SDI. The physical connections of the Internet and the protocols and communication procedures of the Internet are well known to those in the art. It will be also appreciated that such systems may be implemented in an Intranet within an organization.

Access to the Internet 1022 is typically provided by Internet service providers (ISPs), such as the ISP 1024, and the ISP 1026. Users on client systems, such as the client computer systems 1002, 1004, 1018, and 1020, generally obtain access to the Internet through Internet service providers, such as ISPs 1024 and 1026. Access to the Internet may facilitate transfer of information (e.g., email, text files, media files, etc.) between two or more digital processing systems, such as the client computer systems 1002, 1004, 1018, and 1020 and/or a Web server system 1028.

For example, one or more of the client computer systems 1002, 1004, 1018, and 1020 and/or the Web server 1028 may provide document presentations (e.g., a Web page) to another one or more of the client computer systems 1002, 1004, 1018, and 1020 and/or Web server 1028. For example, in one embodiment of the invention, one or more client computer systems 1002, 1004, 1018, and 1020 may request to access a document that may be stored at a remote location, such as the Web server 1028. In the case of remote storage, the data may be transferred as a file (e.g., download) and then displayed (e.g., in a window of a browser) after transferring the file. In another embodiment, the document presentation may be stored locally at the client computer systems 1002, 1004, 1018, and/or 1020. In the case of local storage, the client system may retrieve and display the document via an application, such as a word processing application, without requiring a network connection.

The Web server 1028 typically includes at least one computer system to operate with one or more data communication protocols, such as the protocols of the World Wide Web and, as such, is typically coupled to the Internet 1022. Optionally, the Web server 1028 may be part of an ISP which may provide access to the Internet and/or other network(s) for client computer systems. The client computer systems 1002, 1004, 1018, and 1020 may each, with appropriate Web browsing software, access data, such as HTML document (e.g., Web pages), which may be provided by the Web server 1028.

The ISP 1024 provides Internet connectivity to the client computer system 1002 via a modem interface 1006, which may be considered as part of the client computer system 1002. The client computer systems 1002, 1004, 1018, and 1020 may be a conventional data processing system, such as a Power Mac G5 or iMac computer available from Apple Computer, Inc., a "network" computer, a handheld/portable computer, a cell phone with data processing capabilities, a Web TV system, or other types of digital processing systems (e.g., a personal digital assistant (PDA)).

Similarly, the ISP 1026 provides Internet connectivity for the client computer systems 1002, 1004, 1018, and 1020. However, as depicted in FIG. 10, such connectivity may vary between various client computer systems, such as the client computer systems 1002, 1004, 1018, and 1020. For example, as shown in FIG. 10, the client computer system 1004 is coupled to the ISP 1026 through a modem interface 1008, while the client computer systems 1018 and 1020 are part of a local area network (LAN). The interfaces 1006 and 1008, shown as modems 1006 and 1008, respectively, may represent an analog modem, an ISDN modem, a DSL modem, a cable modem, a wireless interface, or other interface for coupling a digital processing system, such as a client computer system, to another digital processing system.

The client computer systems 1018 and 1020 are coupled to a LAN bus 1012 through network interfaces 1014 and 1016, respectively. The network interface 1014 and 1016 may be an Ethernet-type, asynchronous transfer mode (ATM), or other type of network interface. The LAN bus is also coupled to a gateway digital processing system 1010, which may provide firewall and other Internet-related services for a LAN. The gateway digital processing system 1010, in turn, is coupled to the ISP 1026 to provide Internet connectivity to the client computer systems 1018 and 1020. The gateway digital processing system 1010 may, for example, include a conventional server computer system. Similarly, the Web server 1028 may, for example, include a conventional server computer system.

In one embodiment, the local area network 1012 may be local wireless network (e.g., a home network) and the gateway 1010 may include a wireless access point (also referred to as a base station) to one or more clients 1018 and 1020 using a variety of wireless networking protocols; for example, the IEEE 802.xx protocols including Wi-Fi and/or Bluetooth protocols. In a further embodiment, the gateway 1010 may access the server 1028 via dialup network services using a modem.

According to one embodiment, the content rating techniques, such as token-based and/or link-based content rating techniques, described above may be implemented with any of the network access devices, such as, modems 1006 and 1008, and/or gateway 1010.

Exemplary Data Processing System

Figure 11:
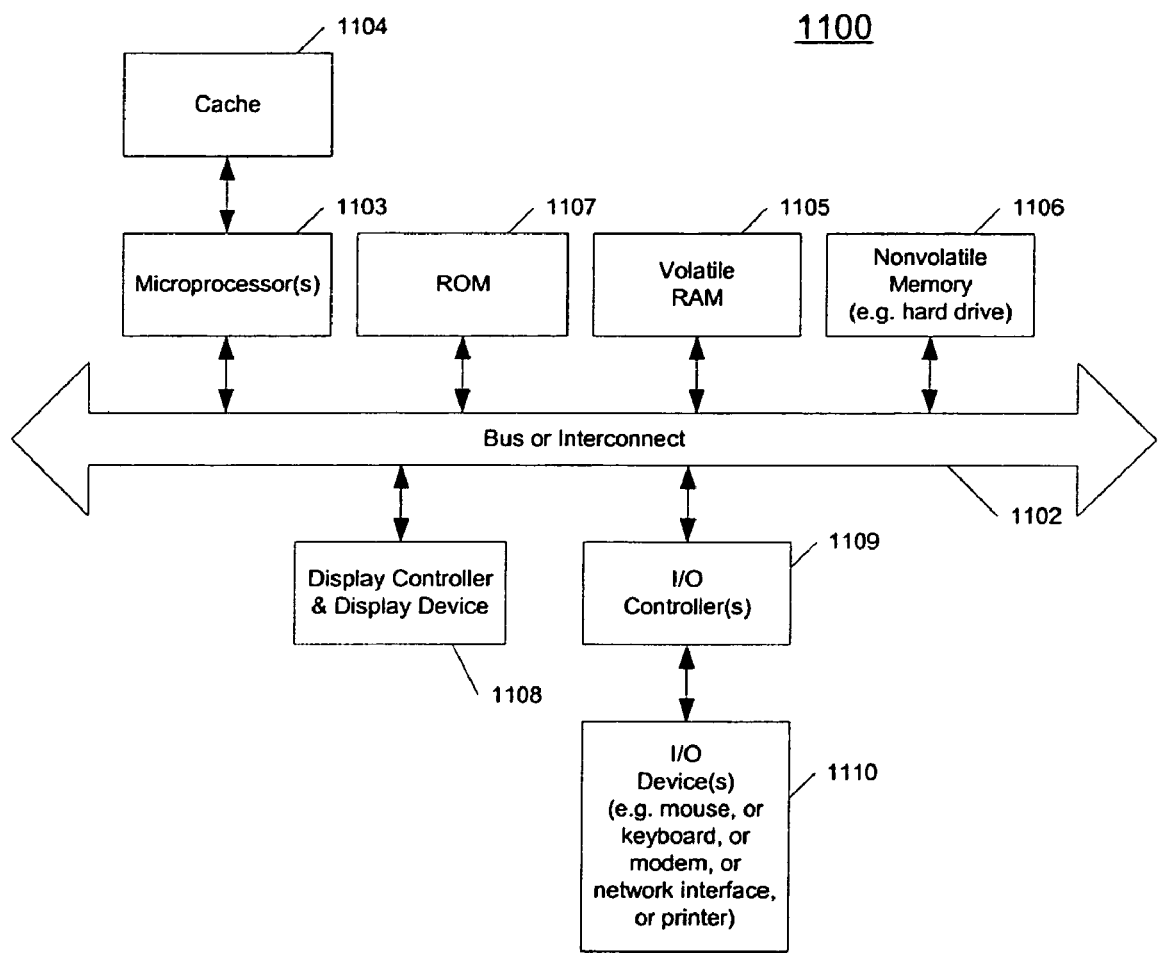
FIG. 11 is a block diagram of a digital processing system which may be used with one embodiment of the invention.

FIG. 11 is a block diagram of a digital processing system which may be used with one embodiment of the invention. For example, the system 1100 shown in FIG. 11 may be used as a client computer system such as clients 904-905 of FIG. 9. Alternatively, the exemplary system 1100 may be implemented as a network access device 902, content rating engine 908, and/or Web servers 906-907, etc.

Note, that while FIG. 11 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 11 may, for example, be an Apple Macintosh computer or an IBM compatible PC.

As shown in FIG. 11, the computer system 1100, which is a form of a data processing system, includes a bus 1102 which is coupled to a microprocessor 1103 and a ROM 11011, a volatile RAM 1105, and a non-volatile memory 1106. The microprocessor 1103, which may be, for example, a PowerPC G4 or PowerPC G5 microprocessor from Motorola, Inc. or IBM, is coupled to cache memory 1104 as shown in the example of FIG. 11. The bus 1102 interconnects these various components together and also interconnects these components 1103, 11011, 1105, and 1106 to a display controller and display device 1108, as well as to input/output (I10) devices 1110, which may be mice, keyboards, modems, network interfaces, printers, and other devices which are well-known in the art.

Typically, the input/output devices 1110 are coupled to the system through input/output controllers 1109. The volatile RAM 1105 is typically implemented as dynamic RAM (DRAM) which requires power continuously in order to refresh or maintain the data in the memory. The non-volatile memory 1106 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 11 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1102 may include one or more buses connected to each other through various bridges, controllers, and/or adapters, as is well-known in the art. In one embodiment, the I/O controller 1109 includes a USB (Universal Serial Bus) adapter for controlling USB peripherals. Alternatively, I/O controller 1109 may include an IEEE-1394 adapter, also known as FireWire adapter, for controlling FireWire devices. Other components may also be included.

Thus, methods and apparatuses for link-based content ratings for Web pages have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, the present invention is not described with reference to any particular programming language. It will be appreciated that a variety of programming languages may be used to implement the teachings of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method, comprising:
determining statistics for each of a plurality of Web pages with respect to one or more predetermined categories based on content rating of each of the Web pages; and
for each of the predetermined categories, selecting a set of primary Web pages having relationships with one or more secondary Web pages, wherein the one or more secondary Web pages probabilistically distinguish from relationships with a remainder of the secondary Web pages, wherein the selected set of primary Web pages having relationships with one or more secondary Web pages are used by a network access device to determine a probability that a particular Web page received at the network access device responsive to a request by a client belongs to one or more of the predetermined categories based on a linking pattern of the particular Web page linked with other Web pages using content ratings of the selected set of primary Web pages and the associated secondary Web pages,
wherein the network access device is a gateway device that interfaces the client of a local area network (LAN) with a Web server of an external network, wherein the particular Web page is routed exclusively through the gateway device from the external network to the client with the gateway device acting as a sole interface between the LAN and the external network for the purpose of downloading a Web site, and wherein the determined probability of the particular Web page is used by the network access device to determine whether the particular Web page should be delivered to the client over the LAN.

2. The method of claim 1, further comprising assigning a probability to each of the primary Web pages having relationships with one or more secondary Web pages to one or more of the predetermined categories to represent a likelihood of a Web page having similar configuration is associated with a respective category, wherein the probability is determined based on a number of occurrence of a linked-to category in training data associated with each category and in a particular Web page being categorized.

3. The method of claim 2, wherein the probability is determined based on a summation of probabilities calculated using following formula:

$$\sum_{s \in S} P_i(W \mid T, s) = \frac{P_i(W \mid s) P_i(T \mid W, s)}{P_i(T \mid s)}$$

wherein $P_i(X, s)$ is the probability at which a linked-to category number (s) occurs in X which is a set of input Web pages for category (i), wherein the linked-to category number (s) is greater than one, wherein T is a set of training data and W is a Web page being categorized, and wherein S is a set of all linked-to category number (s) that appear in the training data (T) or the Web page (W).

4. The method of claim 3, further comprising:
storing in a database the selected primary and secondary Web pages as a trained set of Web pages for rating a subsequent Web page; and
storing in the database relationships between the primary and secondary Web pages as one or more rules, wherein the one or more rules are used to categorize the subsequent Web page having similar relationships with one or more selected secondary Web pages into one or more of the predetermined categories.

5. The method of claim 4, further comprising:
receiving at the network access device a first Web page from a Web server over the external network, the first Web page being requested from a client over the LAN, the first Web page having one or more links linking with one or more second Web pages;
the network access device accessing the one or more links of the first Web page to obtain the one or more second Web pages;
the network access device accessing the database to obtain content rating for each of the second Web pages based on a trained set of Web pages; and
the network access device determining a final rating for the first Web page based on the content rating of each of the second Web pages.

6. The method of claim 5, further comprising the network access device accessing the database to obtain content rating of the first Web page based on the content of the first Web page, where the final rating of the first Web page is determined further based on the content rating of the first Web page.

7. The method of claim 5, further comprising the network access device determining whether the client is allowed to access the first Web page based on the final rating of the first Web page.

8. The method of claim 7, further comprising:
if the database does not contain content rating of any one of the first and second Web pages, performing content rating on any one of unrated first and second Web pages; and
storing the content ratings of the unrated Web pages in the database as a part of trained set of Web pages.

9. The method of claim 1, wherein a relationship between a primary Web page of the plurality of primary Web pages and a secondary Web page of the one or more secondary Web pages is determined based on a link linking with the primary and secondary Web pages and content of the primary and secondary Web pages.

10. The method of claim 9, wherein the link is a URL (universal resource locator) compatible link within the primary Web page linking with the secondary Web page, and wherein the external network is part of the Internet.

11. The method of claim 9, further comprising:
performing content rating on the primary Web page; and
for each of the linked secondary Web pages of the primary Web page, accessing the respective secondary Web page via the respective link and performing content rating on the respective secondary Web page.

12. The method of claim 11, further comprising determining a probability of the primary Web page linking with the secondary Web pages based on the contenting rating of the primary and secondary Web pages, wherein the probability of the primary Web page linking with the secondary Web pages represents a likelihood that the primary Web page belongs to one of the predetermined categories.

13. The method of claim 1, wherein the gateway device comprises a modem.

14. A machine-readable storage medium having executable code stored thereon to cause a machine to perform a method, the method comprising:
determining statistics for each of a plurality of Web pages with respect to one or more predetermined categories based on content rating of each of the Web pages; and
for each of the predetermined categories, selecting a set of primary Web pages having relationships with one or more secondary Web pages, wherein the one or more secondary Web pages probabilistically distinguish from relationships with a remainder of the Web pages, wherein the selected set of primary Web pages having relationships with one or more secondary Web pages are used by a network access device to determine a probability that a particular Web page received at the network access device responsive to a request by a client belongs to one or more of the predetermined categories based on a linking pattern of the particular Web page linked with other Web pages using content ratings of the selected set of primary Web pages and the associated secondary Web pages,
wherein the network access device is a gateway device that interfaces the client of a local area network (LAN) with a Web server of an external network, wherein the particular Web page is routed exclusively through the gateway device from the external network to the client with the gateway device acting as a sole interface between the LAN and the external network for the purpose of downloading a Web site and wherein the determined probability of the particular Web page is used by the network access device to determine whether the particular Web page should be delivered to the client over the LAN.

15. The machine-readable storage medium of claim 14, wherein the gateway device comprises a modem.

16. A system, comprising:
a processor; and
a memory coupled to the processor to store instructions, when executed from the memory, cause the processor to perform operations including
determining statistics for each of a plurality of Web pages with respect to one or more predetermined categories based on content rating of each of the Web pages, and
for each of the predetermined categories, selecting a set of primary Web pages having relationships with one or more secondary Web pages, wherein the one or more secondary Web pages probabilistically distinguish from relationships with a remainder of the Web pages, wherein the selected set of primary Web pages having relationships with one or more secondary Web pages are used by a network access device to determine a probability that a particular Web page received at the network access device responsive to a request by a client belongs to one or more of the predetermined categories based on a linking pattern of the particular Web page linked with other Web pages using content ratings of the selected set of primary Web pages and the associated secondary Web pages,
wherein the network access device is a gateway device that interfaces the client of a local area network (LAN) with a Web server of an external network, wherein the particular Web page is routed exclusively through the gateway device from the external network to the client with the gateway device acting as a sole interface between the LAN and the external network for the purpose of downloading a Web site, and wherein the determined probability of the particular Web page is used by the network access device to determine whether the particular Web page should be delivered to the client over the LAN.

17. The system of claim 16, wherein the gateway device comprises a modem.

18. A computer implemented method, comprising:
in response to a first Web page requested from a client and the first Web page having one or more links linking with one or more second Web pages, a network access device receiving the first Web page responsive to a request by the client and accessing the one or more links of the first Web page to obtain the one or more second Web pages, wherein the network access device is a gateway device interfacing the client over a local area network (LAN) with an external network, and wherein the first Web page and the one or more second Web pages are routed exclusively through the gateway device from the external network to the client with the gateway device acting as a sole interface between the LAN and the external network for the purpose of downloading a Web site;
the network access device accessing a database to obtain content rating for each of the second Web pages based on a trained set of Web pages; and
determining a final rating for the first Web page based on the content rating of each of the second Web pages, wherein the final rating of the first Web page indicates a probability that the first Web page belongs to a predetermined category based on a linking pattern of the first Web page with the second Web pages using the content rating of the second Web pages in view of the trained set of the Web pages, wherein the determined final rating associated with the first Web page is used by the network access device to determine whether the first Web page should be delivered to the client over the LAN.

19. The method of claim 18, further comprising accessing the database to obtain content rating of the first Web page based on the content of the first Web page, where the final rating of the first Web page is determined further based on the content rating of the first Web page.

20. The method of claim 18, further comprising the network access device determining whether the client is allowed to access the first Web page based on the final rating of the first Web page.

21. The method of claim 20, further comprising:
if the database does not contain content rating of any one of the first and second Web pages, performing content rating on any one of unrated first and second Web pages; and storing the content ratings of the unrated Web pages in the database as a part of trained set of Web pages.

22. The method of claim 18, wherein the gateway device comprises a modem.

23. A machine-readable storage medium having executable code stored thereon to cause a machine to perform a method, the method comprising:
   in response to a first Web page requested from a client and the first Web page having one or more links linking with one or more second Web pages, a network access device receiving the first Web page responsive to a request by the client and accessing the one or more links of the first Web page to obtain the one or more second Web pages, wherein the network access device is a gateway device interfacing the client over a local area network (LAN) with an external network, and wherein the first Web page and the one or more second Web pages are routed exclusively through the gateway device from the external network to the client with the gateway device acting as a sole interface between the LAN and the external network for the purpose of downloading a Web site;
   accessing a database to obtain content rating for each of the second Web pages based on a trained set of Web pages; and
   determining a final rating for the first Web page based on the content rating of each of the second Web pages, wherein the final rating of the first Web page indicates a probability that the first Web page belongs to a predetermined category based on a linking pattern of the first Web page with the second Web pages using the content rating of the second Web pages in view of the trained set of the Web pages, wherein the determined final rating associated with the first Web page is used by the network access device to determine whether the first Web page should be delivered to the client over the LAN.

24. The machine-readable storage medium of claim 23, wherein the gateway device comprises a modem.

25. A system, comprising:
a processor; and
a memory coupled to the processor to store instructions, when executed from the memory, cause the processor to perform operations including
   in response to a first Web page requested from a client and the first Web page having one or more links linking with one or more second Web pages, a network access device receiving the first Web page responsive to a request by the client and accessing the one or more links of the first Web page to obtain the one or more second Web pages, wherein the network access device is a gateway device interfacing the client over a local area network (LAN) with an external network, and wherein the first Web page and the one or more second Web pages are routed exclusively through the gateway device from the external network to the client with the gateway device acting as a sole interface between the LAN and the external network for the purpose of downloading a Web site,
   accessing a database to obtain content rating for each of the second Web pages based on a trained set of Web pages, and
   determining a final rating for the first Web page based on the content rating of each of the second Web pages, wherein the final rating of the first Web page indicates a probability that the first Web page belongs to a predetermined category based on a linking pattern of the first Web page with the second Web pages using the content rating of the second Web pages in view of the trained set of the Web pages, wherein the determined final rating associated with the first Web page is used by the network access device to determine whether the first Web page should be delivered to the client over the LAN.

26. The system of claim 25, wherein the gateway device comprises a modem.

* * * * *